(12) United States Patent
Morita et al.

(10) Patent No.: US 7,376,903 B2
(45) Date of Patent: May 20, 2008

(54) 3D DISPLAY SYSTEM AND METHOD

(75) Inventors: Mark M. Morita, Arlington Heights, IL (US); Steven L. Fors, Chicago, IL (US); Khal A. Rai, Round Lake, IL (US)

(73) Assignee: GE Medical Systems Information Technologies, Milwaukee, WI (US)

( * ) Notice: Subject to any disclaimer, the term of this patent is extended or adjusted under 35 U.S.C. 154(b) by 644 days.

(21) Appl. No.: 10/880,772

(22) Filed: Jun. 29, 2004

(65) Prior Publication Data
US 2005/0289472 A1 Dec. 29, 2005

(51) Int. Cl.
*G06F 3/048* (2006.01)
*G06F 3/01* (2006.01)
*A61B 5/05* (2006.01)

(52) U.S. Cl. ............... 715/757; 715/701; 715/702; 600/424

(58) Field of Classification Search ............... 715/723, 715/756, 757, 701, 702; 600/424
See application file for complete search history.

(56) References Cited

U.S. PATENT DOCUMENTS

| | | | |
|---|---|---|---|
| 5,740,802 A * | 4/1998 | Nafis et al. ............ | 434/267 |
| 6,526,304 B1 | 2/2003 | Patel et al. | |
| 6,529,757 B1 | 3/2003 | Patel et al. | |
| 6,549,214 B1 | 4/2003 | Patel et al. | |
| 6,564,336 B1 | 5/2003 | Majkowski | |
| 6,608,628 B1 * | 8/2003 | Ross et al. ............ | 715/756 |
| 6,633,674 B1 | 10/2003 | Barnes et al. | |
| 6,675,271 B1 | 1/2004 | Xu et al. | |
| 6,718,192 B1 | 4/2004 | Samara et al. | |
| 6,766,297 B1 | 7/2004 | Lamer et al. | |
| 2002/0113752 A1 | 8/2002 | Sullivan et al. | |
| 2002/0130820 A1 | 9/2002 | Sullivan | |
| 2002/0163482 A1 | 11/2002 | Sullivan | |
| 2003/0016207 A1 | 1/2003 | Tremblay et al. | |
| 2003/0085866 A1 | 5/2003 | Bimber et al. | |

OTHER PUBLICATIONS

TeraRecon, Inc., Medical Solutions; Imaging Solutions and Service Latest News, Copyright © 2004, http://www.terarecon.com/home.html, (believed to have been first published prior to filing date) (2 pages).
TeraRecon, Inc., Product Descriptions, http://www.terarecon.com/products/prod_index.html, (believed to have been first published prior to filing date) (5 pages), no date.
About TeraRecon, Company Description, Copyright © 2004, http://www.terarecon.com/about/about_index.html, (believed to have been first published prior to filing date) (1 page).

(Continued)

Primary Examiner—Weilun Lo
Assistant Examiner—Truc T. Chuong
(74) Attorney, Agent, or Firm—Andrus, Sceales, Starke & Sawall, LLP

(57) ABSTRACT

A 3D volumetric display system is configured to generate 3D diagnostic displays of 3D volumetric data acquired from a patient by an imaging system in a virtual-reality environment and to permit a user to conduct diagnostic interpretation of images in the virtual-reality environment and to permit the user to interact with the 3D diagnostic displays.

32 Claims, 5 Drawing Sheets

OTHER PUBLICATIONS

TeraRecon Vision, Copyright © 2004, http://www.terarecon.com/about/vision_about.html, (believed to have been first published prior to filing date) (1page).

TeraRecon History, Copyright © 2004 http://terarecon.com//about/history_about.html, (believed to have been first published prior to filing date) (2 pages).

TeraRecon News & Events, Copyright © 2004 http://www.terarecon.com/news/news_index.html, (believed to have been first published prior to filing date) (1 page).

TeraRecon Image Gallery, Copyright © 2004, http://www.terarecon.com/gallery/gallery_index.html, (believed to have been first published prior to filing date) (1 page).

TeraRecon Medical Image Gallery, Copyright © 2004, http://www.terarecon.com/gallery/med_gallery.html, (believed to have been first published prior to filing date) (3 pages).

TeraRecon Geoscience Image Gallery, Copyright © 2004, http://www.terarecon.com/gallery/geo_gallery.html, (believed to have been first published prior to filing date) (2 pages).

TeraRecon—Aquarius Workstations and Servers Product Descriptions, Copyright © 2004, http://www.terarecon.com/products/aquarius_prod.html, (believed to have been first published prior to filing date) (2 pages).

TeraRecon—Portable Ultrasound System Datasheet, Copyright © 2004, http://www.terarecon.com/products/us_prod.html, (believed to have been first published prior to filing date) (1 page).

TeraRecon—VolumePro™—Volume Rendering Hardware Solutions, Copyright © 2004, http://www.terarecon.com/products/volumepro_prod.html, (believed to have been first published prior to filing date) (3 pages).

TeraRecon—XTrillion Technology, Reconstruction Solutions, Copyright © 2004, http://www.terarecon.com/products/recon_technology_prod.html, (believed to have been first published prior to filing date) (2 pages).

TeraRecon—3D Cone Beam CT Product Description, Copyright © 2004, http://www.terarecon.com/products/3dct_prod.html, (believed to have been first published prior to filing date) (2 pages).

GE Healthcare—Product Specifications—Advantage Workstation, Copyright General Electric Company 1997-2004, http://www.gehealthcare.com/usen/aw/index.html, (1 page).

Electronic Visualization Laboratory—Immersive Design and Fabrication of Cranial Implants on PARIS™, Nov. 12, 2003, http://www.evl.uic.edu/research/res_project.php3?indi=232, (2 pages).

Human Factors in Haptic Interfaces, *ACM Crossroads* Student Magazine, The ACM's First Electronic Publication, Nov. 11, 2003, http://www.acm.org/crossroads/xrds3-3/haptic.html, (8 pages).

Immersive Design and Fabrication of Cranial Implants on PARIS™ (Personal Augmented Reality Immersive System) Description, University of Illinois at Chicago, Nov. 2003, (2 pages).

The V-Wand™ Product Specification, Fakespace Systems, Inc., http://www.fakespacesystem.com, (believed to be available prior to filing date) (1 page), no date.

Radiology—Centricity PACS Products Description, Streamlining Image Communication Enterprise-Wide, GE Medical Systems Information Technologies, Copyright © 2001 General Electric Company, (3 pages).

* cited by examiner

3D DISPLAY SYSTEM AND METHOD

FIELD OF THE INVENTION

This invention relates to three dimensional (3 D) display systems and more particularly, to a 3D volumetric display system and method of assisting medical diagnostic interpretation of images and data in a virtual-reality environment.

BACKGROUND OF THE INVENTION

There are many medical imaging systems used to acquire medical images suitable for diagnosing disease or injury. These include X-ray, CT scanner, magnetic resonance imaging (MRI), ultrasound, and nuclear medicine systems. These medical imaging systems are capable of acquiring large amounts of image data during a patient scan. The medical imaging devices are generally networked with a central image management system, such as Picture Archiving and Communication System (PACS).

In most cases, the image data is acquired as a series of contiguous two-dimensional (2D) slice images for diagnostic interpretation. For example, 100 to 1000 2D images may be acquired and viewed one at a time by scrolling through all the 2D images by the physician to diagnose the disease or injury. As a result, the physician is faced with the formidable task of viewing all the acquired 2D images to locate the region of interest where the disease or injury has occurred and then to select the diagnostically most useful images. As the image data sets get larger, this method of scrolling through the 2D images using a computer mouse by the physician and viewing each image becomes very time consuming and monotonous.

What is needed therefore is a system and method to improve diagnostic process and workflow through advanced visualization and user-interface technologies. What is also needed is a system and method of conducting diagnostic interpretation of the image data in a virtual-reality environment. What is also needed is a system and method of interacting with a patient's anatomy to conduct diagnostic interpretation of the image data by using tactile feedback on a variety of anatomical structures. What is also needed is a system and method of enabling a physician to contact and to manipulate the images for diagnosing anomalies in the virtual-reality environment. What is also needed is a graphical user interface (GUI) to permit an operator to use his/her hands to interactively manipulate virtual objects. These improvements would give physicians an ability to quickly navigate through a large image data set and would provide more efficient workflow. It should be understood, of course, that embodiments of the invention may also be used to meet other needs in addition to and/or instead of those set forth above.

BRIEF SUMMARY OF THE INVENTION

In accordance with a preferred first aspect of the invention, an apparatus comprises a 3D volumetric display system configured to generate 3D diagnostic displays of 3D volumetric data acquired from a patient by an imaging system in a virtual-reality environment and to permit a user to conduct diagnostic interpretation of images in the virtual-reality environment and to permit the user to interact with the 3D diagnostic displays.

In accordance with another preferred aspect of the invention, a diagnostic apparatus comprises a display system. The system includes a graphical user interface (GUI) and a haptics-enhanced virtual-reality device coupled to the picture archiving and communication system (PACS) and the image workstation to display stereoscopic images so that a user can touch and interact with a virtual object. The GUI is configured to access simultaneously in a PACS and an image workstation. The GUI is also configured to navigate through a diagnostic image data and a patient's data without post-processing of the diagnostic images.

In accordance with a further preferred aspect of the invention, a method of assisting medical diagnostic interpretation of images and data is provided. The method comprises generating diagnostic images of a portion of patient's body by using a display system during examination of the portion of the portion of patient's body in accordance to symptoms, replicating the portion of patient's body from the diagnostic images by using a haptics-enhanced virtual-reality device of the display system, and displaying the replicated portion of the patient's body in a virtual-reality environment.

In accordance with yet a further preferred aspect of the invention, a diagnostic system comprises means for generating diagnostic real-time images of a portion of patient's body during examination of the portion of patient's body in accordance to symptoms, means for replicating the portion of patient's body from the real-time images, and means for displaying the replicating portion of patient's body in a virtual environment.

DETAILED DESCRIPTION OF PREFERRED EMBODIMENTS

Figure 1:
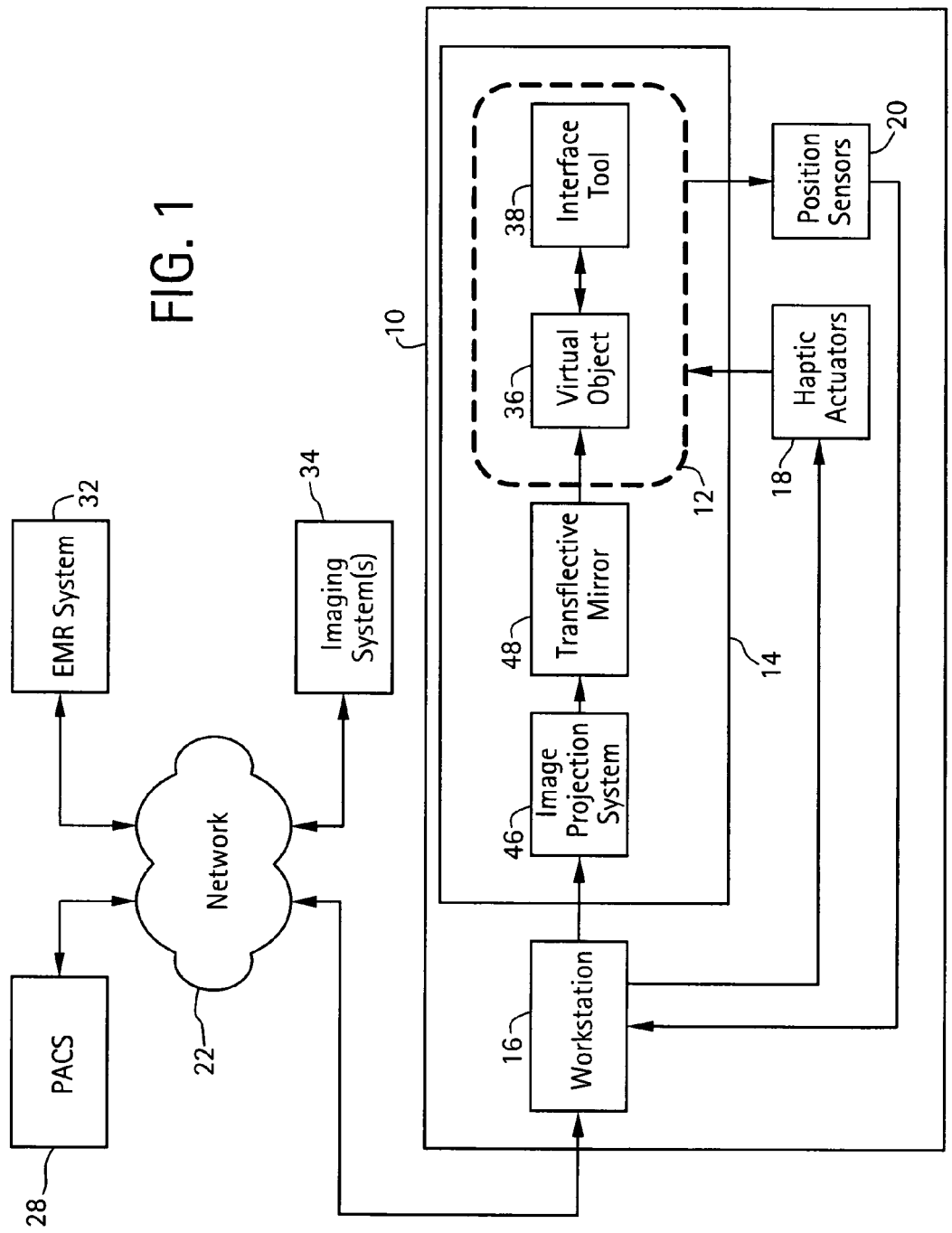
FIG. 1 is a block diagram of a 3D volumetric display system which employs an embodiment of the present invention.
Figure 2:
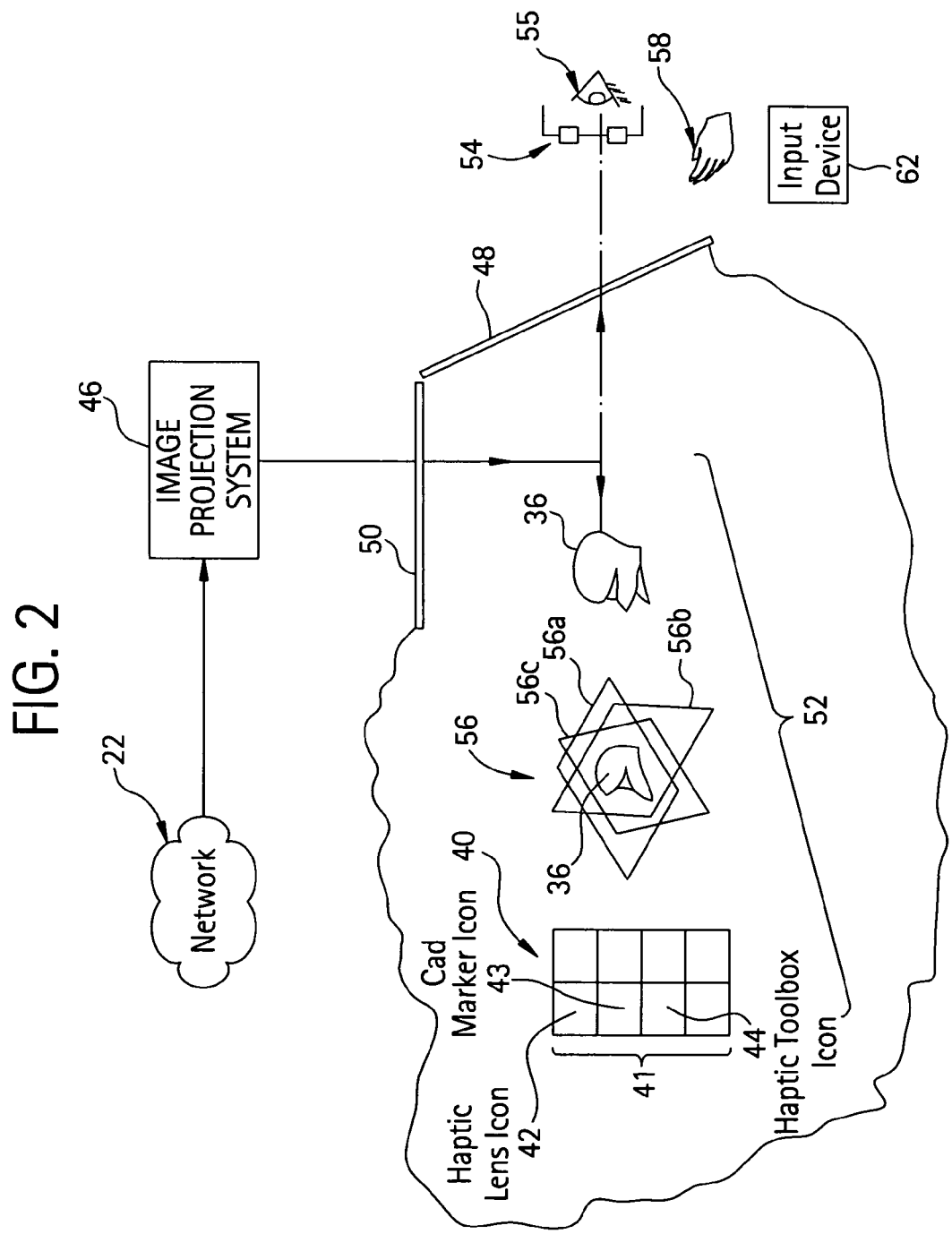
FIG. 2 is an implementation of the 3D volumetric display system shown in FIG. 1 in a virtual reality environment.

FIGS. 1 and 2 illustrate a 3D volumetric display system 10 which implements a virtual-reality environment 12. The 3D volumetric display system (hereinafter "display system") 10 includes a haptics-enhanced virtual-reality system 14, a workstation 16, a plurality of haptic actuators 18, and a plurality of position sensors or trackers 20. The display system 10 may be coupled by way of a network 22 to receive data from, among others, a picture archival and communication system (PACS) 28, an electronic medical records system 32, and one or more imaging systems 34. Although not shown, the PACS 28, the electronic medical record (EMR) system 32, and the imaging system 34 may each comprise or be associated with one or more additional workstations, networks/sub-networks, and so on.

The haptics-enhanced virtual-reality system 14 is driven by the workstation 16 to display stereoscopic images 52 so that a user can touch and interact with a virtual object 36, i.e., an anatomical structure of a patient's body. The images may be received by the workstation 16 from the PACS 28, which stores images received from the imaging systems 34. Alternatively, the images may be received directly from one of the imaging systems 34, e.g., to allow a virtual examination of the patient's anatomy during a minimally-invasive surgical procedure. Haptic feedback is provided to the operator using the haptic actuators 18 and which apply forces to a user's hands and fingers. The haptic feedback may assist and inform the user of interactions and events within the virtual reality environment 12. The plurality of haptic actuators 18 and the plurality of position sensors or trackers 20 are connected to the workstation 16 to permit interaction in the virtual-reality environment 12. The actuators 18 and the trackers 20 may be mounted to a common user interface device, such as one or more haptic gloves 58 (see FIG. 2), such that the trackers 20 provide information to the workstation 16 regarding the position of the operator's hands and fingers, while at the same time the actuators 18 apply forces to the user's hands and fingers to provide a haptic sensation to the user of contacting the virtual object 36 (in accordance with the known position of the user's hands and fingers within the virtual reality environment 12). Control signals for the haptic actuators 18 are generated by the workstation 16 based not only on the position of the user's hands and fingers, but also based on the known anatomical structure of the patient as represented in the image data received from the PACS 28 and/or the imaging systems 34.

Each imaging system 34 may include an acquisition workstation (not shown) which acts as a gateway between the imaging systems 34 and the network 22. To that end, the acquisition workstation may accept raw image data from the imaging systems 34 and optionally perform pre-processing on image data in preparation for delivering image data to the PACS network 28 for storage in a PACS image database (not shown). In operation, the acquisition workstation (not shown) may convert the image data into DICOM, DEFF, or other suitable format.

The display system 10 is configured to generate 3D diagnostic displays of 3D volumetric medical data network 22 acquired from a patient by one or more of the imaging systems 34. The 3D displays are generated in the virtual-reality environment 12. The display system 10 permits a user, such as a physician or radiologist, to conduct diagnostic interpretation of images in the virtual reality environment 12 and to interact with the 3D diagnostic displays. The imaging systems 34 may include, but are not limited to, magnetic resonance imaging devices, computed tomography (CT) devices, ultrasound devices, nuclear imaging devices, X-ray devices, and/or a variety of other types of imaging devices. It should be understood that imaging systems 34 are not limited to medical imaging devices and also include scanners and imaging devices from other fields.

As shown in FIGS. 1 and 2, the display system 10 includes a graphical user interface (GUI) that is configured to permit a user to interact with the 3D diagnostic displays generated by the display system 10. The GUI comprises an interface tool 38 which may be customized by the user. In addition, the GUI comprises a tool palette window 40 to display a plurality of toolbar icons 41. The tool palette window 40 includes, but is not limited to, a haptic tool icon 42, a 3D Computer-Aided Diagnosis (CAD) marker icon 43, a haptic toolbox icon 44, and a variety of other icons (not shown) such as an image mask icon, a magnify icon, a horizontal flip icon, a vertical flip icon, a pan icon, a zoom icon, and so on. As will be described in greater detail, each of the icons 41 is configured to permit the user to interact with the 3D diagnostic display. The GUI is configured to navigate through diagnostic image data without post-processing of the diagnostic images. Post-processing refers to image manipulation processing that happens after the image/data is acquired from the modalities (e.g., CT, MR, and so on). For example, one type of post-processing that may be avoided is segmenting, which is a type of post processing used for 3D visualization. With segmenting, extraneous anatomical structure around a structure of interest is removed in order to facilitate examination of the structure of interest. This allows the isolation of a particular anatomical system from the extraneous systems, for example, so that a radiologist would be able to visualize just the veins and arteries while looking for an aneurysm. Other examples of post processing include temporal subtraction for CR images, dual energy subtraction for CR images, and TE algorithm processing for CR mammography images. With on the fly 3D capabilities, many post processing applications can be done on the fly in real time. The GUI enables the user to access, view, manipulate, and conduct diagnostic interpretation of the images. The user interface is provided in the virtual reality environment 16.

It will be appreciated that, although the interface tool (GUI) 38 is shown as being located in the virtual reality environment 12, the GUI is actually implemented by program logic stored and executed in the workstation 16. The workstation 16 receives feedback information from the position sensors 20 and processes the feedback information (in accordance with the stored program logic and in accordance with the stored image data received via the network 22) to drive the haptic actuators 18 and to drive the image projection system 46 (e.g., to alter the GUI display and/or to alter the displayed image data).

As shown best in FIG. 2, the haptics-enhanced virtual-reality system 14 includes an image projection system 46, a transflective (i.e., partially transparent and partially reflective) mirror 48 positioned at an angle, and an overhead substantially opaque screen 50, which cooperate to display stereoscopic images 52. The stereoscopic images 52 are projected on the overhead substantially opaque screen 50 and are reflected on the transflective mirror 48. The operator is able to interact with the 3D/4D image data (virtual object 36) in real time. That is, when the operator places a hand at a location that places the operator's hand into virtual contact with anatomical structure, the GUI provides tactile feedback to the operator's hand via the haptic actuators 18 sufficiently fast such that processing delay is substantially imperceptible to the user. The 3D/4D image data refers to three spatial dimensions and time as the fourth dimension. The stereoscopic images 52 are viewed by the user wearing 3D goggles 54. The 3D goggles may include infrared sensors which track the position and orientation of the goggles 54, and by that means, the position and orientation of the viewer's eye. The infrared sensors transmit the position and orientation information to the workstation 16 which uses the position and orientation information to determine the point of view and viewing direction from which the viewer is viewing the virtual objects. This permits the stereoscopic images 52 to be displayed in a manner that shows the virtual-reality environment 12 as it would be seen from the point of view and viewing direction indicated by the position and orientation information. The stereoscopic images 52 are displayed such that the displayed images track the user's head movement and permit the user to view the imagery from more than one position. The user's hand is in contact with the displayed images and the user is provided with the ability to manipulate and navigate through the 3D diagnostic displays to locate pathology in the virtual-reality environment 12. For example, virtual colonoscopy has become a true reality in medicine with advances in CT and Electron Beam Tomography (EBT). Using the aforementioned technique, it is now possible to conduct diagnosis of the entire colon without sedatives, excessive discomfort, or truly invasive procedures. The virtual colonoscopy makes colon cancer screening more bearable.

While the stereoscopic images 52 provide sufficient information to conduct diagnostic interpretation of the 3D images, many physicians or radiologists prefer to see 2D sectional images taken through the region of interest within the anatomical structure of the patient's body. Such 2D sectional images are often presented as three orthogonal planes including transverse, sagittal, and coronal images 56a, 56b, 56c respectively, depending on their orientation with respect to the patient. Thus, using the 3D diagnostic display to identify a region of interest in the patient, as shown in FIG. 2, a 3D planner image 56 is constructed from the 2D images such as 56a, 56b, 56c to facilitate measurement of the diagnostic interpretation of images for anomalies. The display system 10 enables the user to view and interact with the 3D planner images 56 and 3D diagnostic display simultaneously.

As mentioned above, the display system 10 comprises the haptic actuators 18 which have robotic manipulators (not shown) that apply force to the user's hand corresponding to the environment that a virtual effector (i.e., muscles become active in response to stimulation) is in. The haptics feedback is used to indicate whether the user's hand is in contact with the anatomical structure of a patient's body 36. As previously mentioned, the display system 10 includes haptic glove 58 upon which the haptic actuators 18 are mounted and which is configured to be worn by the user to provide the tactile sensation to the hand of the user to simulate contact with the virtual object 36. The haptic glove 58 provides a sense of touch in the virtual reality environment 12. For example, if a user tries to grab the virtual object 36, the haptic glove 58 provides feedback to let the user know that the virtual object 36 is in contact with the user's hand. Also, the haptic glove 58 provides a mechanism to keep the user's hand from passing through the virtual object 36.

Figure 3:
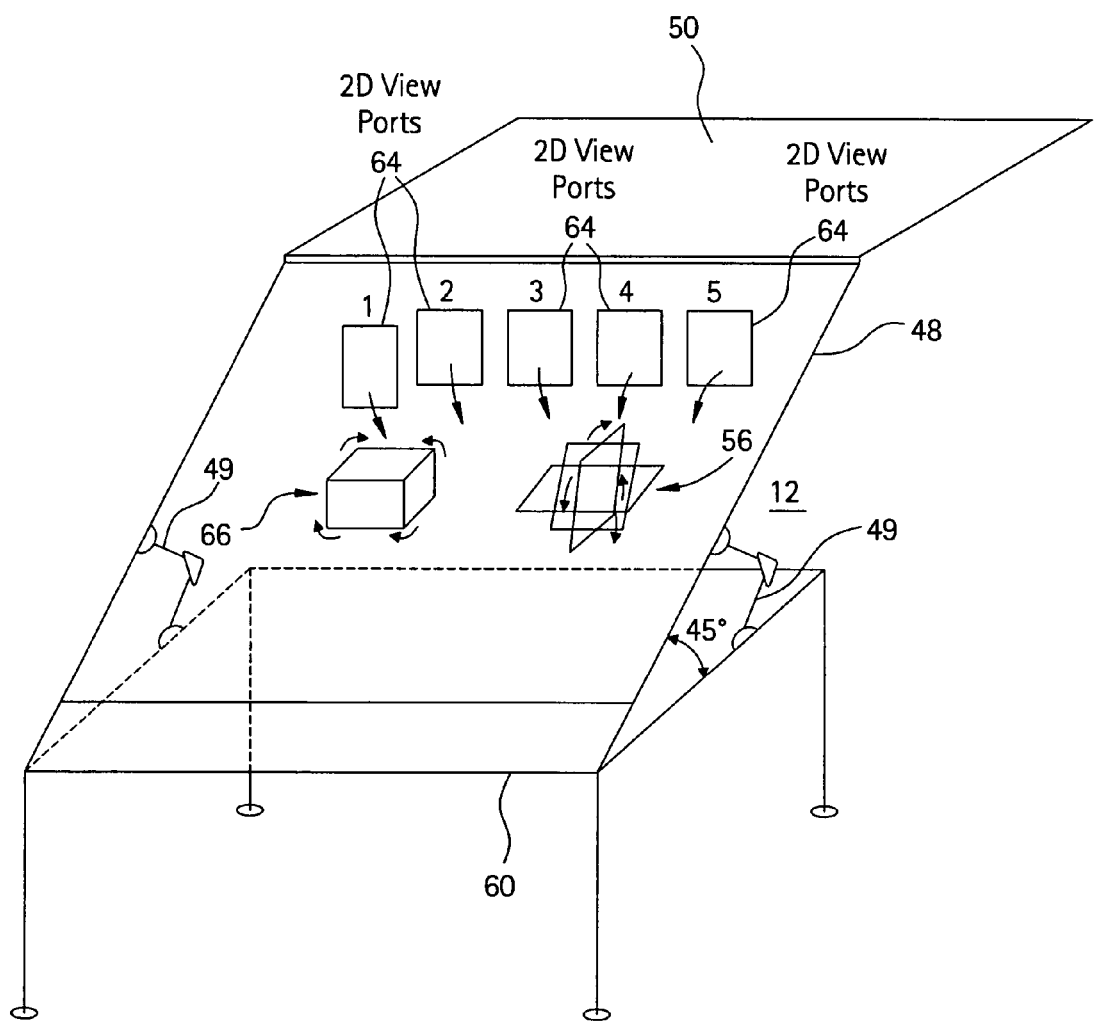
FIG. 3 is a portion of FIG. 2 illustrating a plurality of 2D images in the virtual reality environment.

Referring to FIG. 3, the projection-based display or the virtual-reality environment 12 includes transflective mirror 48 mounted to table 60 with a pair of hinges 49. The transflective mirror 48 is positioned at an angle, preferably 45 degrees, in front of the user. The overhead substantially opaque screen 50 is positioned above the table 60 to superimpose virtual imagery on a physical object, such as a user's hand, below it. The overhead substantially opaque screen 50 is supported by hangers (not shown). The image projection system 46 and the transflective mirror 48 are employed to compactly and brightly illuminate the overhead substantially opaque screen for brilliant contrast. Images projected on the opaque screen 50 are reflected on the transflective mirror 48 positioned over the table 60. Generally, since the user wearing the 3D goggles 54 is standing in front of the transflective mirror 48, the virtual-reality environment 12 behind the transflective mirror 48, when displayed and reflected, has to change in such a way that appears stereoscopically correct. Therefore, when the user puts his or her hands under the transflective mirrored area, the user can see and interact with the virtual image, or the physical haptic devices. A variety of input devices 62, such as haptic stylus, wand and voice commands, can be used in combination to manipulate, modify and examine virtual objects, and interact with other visualized data. This configuration is well suited to the lighting conditions of a typical office environment, and the haptics-enhanced virtual-reality system 14 can be easily packed, moved, and deployed. The transflective mirror 48 can be raised or lowered over the table so the users can either work at their table or in the virtual-reality space.

During imaging of a subject of interest, such as a portion of an anatomical structure of a patient's body 36, one or more of the imaging systems 34 are used to acquire a plurality of 2D images of the subject interest. The PACS 28 archives the plurality of 2D images so they can be selectively retrieved and accessed. Other patient data may also be retrieved, such as electronic medical record data which may be retrieved from the EMR system 32. The plurality of 2D images and/or the patient's medical record is then displayed in the form of 2D viewports 64 in the virtual reality environment 12. The display system 10 is capable of displaying the 2D images 64, 3D planner images 56, and volumetric 3D diagnostic images 66 simultaneously as best shown in FIG. 3. This feature permits a physician or radiologist to easily navigate through the 3D diagnostic images to locate pathology without having to necessarily read each and every one of the 2D images. Once the pathology or area of interest is identified, the physician or radiologist may click on the area of interest within the 3D diagnostic images 66, and the corresponding 3D planner images 56 will update the exact reference point.

The cubical model in FIG. 3 represents the volumetric 3D diagnostic image 66 or a 3D data set. The 3D diagnostic image 66 can be manipulated in any orientation, angle, zoom setting and so forth. In addition, for the 3D diagnostic image 66, transparency and segmentation may also be defined such that the physician or radiologist is permitted to view a variety of anatomical structures of the patient. As noted above, when the user is wearing the 3D goggles 54, the workstation 16 is able to conduct the head tracking and provide stereoscopic visualization of the images. When the user moves his head, an updated view of the 3D diagnostic image 66 is displayed. Additionally, when the user rotates the cubical model, the corresponding 3D planner image 56 orients in synchronization. Further, when the user clicks on a specific part of the anatomy depicted as the cubical model 66, the corresponding planner images 56 and the viewports 64 are instantly updated. This practice permits physicians or radiologists to conduct diagnostic interpretation of the images without scrolling though the datasets examining each image. Since this practice is conducted in the virtual-reality environment 12, as described above, the user is provided with the haptics actuators 18 which permit the user to actually feel tactile differences in the anatomical data.

Figure 4:
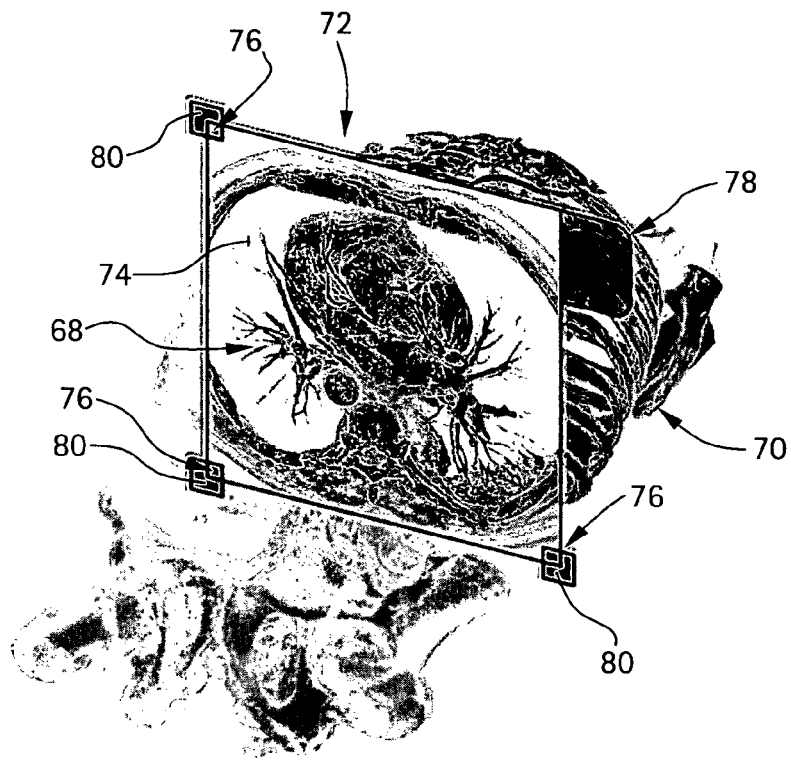
FIG. 4 is a haptic tool configured to be positioned within a stereoscopic image to display a cross-sectional image of an anatomical structure of a patient's body.

FIG. 4 is the haptic tool icon 42 of the tool palette window 40 shown in FIG. 2. The haptic tool icon 42 is configured to be positioned within a stereoscopic image to display a cross-sectional image 68 of an anatomical structure of a patient's body 70 in the virtual-reality environment 12. As mentioned above, the GUI of the 3D display system 10 comprises the haptic tool 72 having a virtual lens 74 configured to navigate through the stereoscopic image to generate a cross-sectional image 68 of the anatomical structure of a patient's body 70 in the virtual-reality environment 12. The virtual lens 74 comprises a plurality of corners 76 spaced apart from one another to encapsulate the virtual anatomical structure of a patient's body 70. The haptic tool 72 is displayed with the haptics-enhanced virtual-reality system 14. The haptic tool 72 provides an intuitive way for navigating through the data set and conducting diagnostic interpretation of the virtual anatomical structure of a patient's body 70.

The haptic tool 72 comprises a virtual handle 78 attached to one of the plurality corners 76 of virtual lens 74 to permit a user to navigate through the anatomical structure of a patient's body 70. The virtual handle 78 is configured to be held by the user wearing the haptic glove 58 when the haptic tool 72 is navigated through the virtual anatomical structure of a patient's body 70. The haptic actuators 18 in FIG. 1 are configured to provide a tactile feedback regarding contact between the user's hands with the anatomical structure of a patient's body 70. Since the user is wearing the haptic glove 58, the haptic actuators 18 outputs a pressure to the haptic glove 58 which is felt by the user's sense of touch. The tactile feedback sensation that the user feels is generated by the haptic glove 58.

The haptic tool 72 further comprises a virtual tab 80 disposed on at least two of the plurality of corners 76 of the virtual lens 74. The virtual tabs 80 permit the user to change the dimensional size and orientation of the haptic tool 72 within the virtual anatomical structure of a patient's body 70. The haptic tool is capable of depicting the cross-sectional image 68 that is characterized by combination of three orthogonal planes including transverse, sagittal, and coronal planes as depicted by 56a, 56b, and 56c respectively. The haptic tool 72 is configured to be positioned at various orientations and angles with respect to the virtual anatomical structure of a patient's body 70 to generate the cross-sectional image 68 within stereoscopic image. For example, the haptic tool 72 is capable of displaying a cross-sectional image that is configured to be constructed from a combination of transverse, sagittal, and coronal images. In operation, when the haptic tool 72 is navigated through the stereoscopic image responsive to user inputs, coordinates of the haptic tool 72 are mapped with a boundary of the virtual anatomical structure of a patient's body 70 to generate the cross-sectional image 68 and then the cross-sectional image is displayed to permit a diagnostic interpretation of the image to be conducted.

Figure 5:
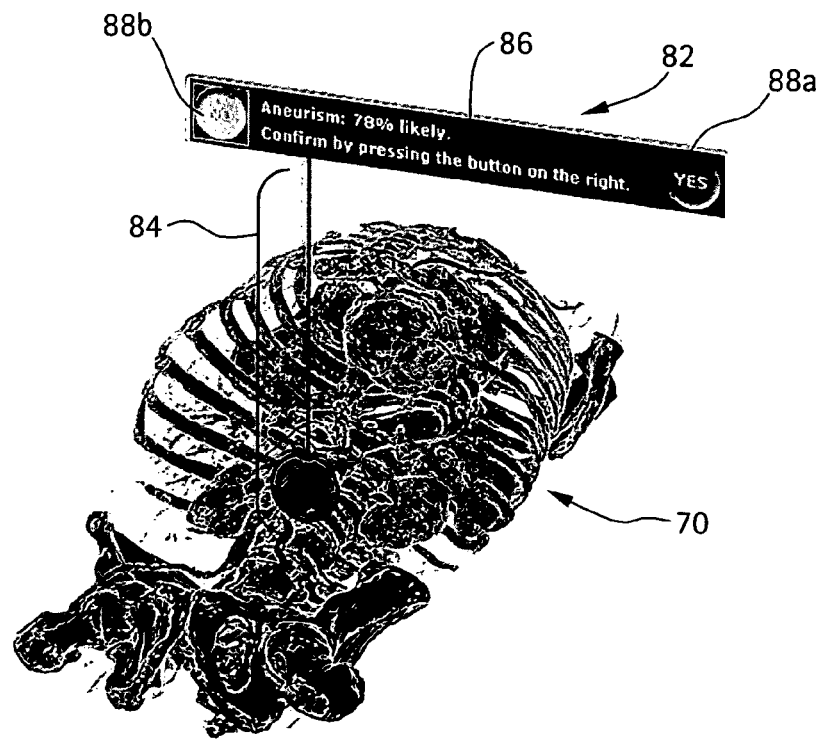
FIG. 5 is a 3D Computer-Aided Diagnosis (CAD) marker configured to be used in a stereoscopic image to indicate likelihood of an anomaly in the anatomical structure of a patient's body.

FIG. 5 is a 3D CAD marker icon 43 of the tool palette window 40 shown in FIG. 2. The 3D CAD marker 82 has a delineator 84 configured to be navigated in the anatomical structure of a patient's body 70 to locate a pathology or anomaly and to permit the user to compile and prepare a report containing diagnosis information in a virtual-reality environment 12. The delineator 84 includes a 3D delineator having a boundary that defines a perimeter of the anomaly. The 3D CAD marker 82 is displayed with the haptics-enhanced virtual-reality system 14. In FIG. 5, there is shown just one 3D CAD marker 82 but, alternatively, a plurality of 3D CAD markers may be used to navigate in a virtual anatomical structure of a patient's body 70 to locate a pathology or anomaly.

The 3D CAD marker 82 includes a status indicator 86 which is associated with the delineator 84 to display diagnosis information in the virtual-reality environment. The status indicator 86 comprises a plurality of command buttons configured to receive a user input to compile the diagnostic report. The plurality of command buttons comprises first and second buttons (e.g., YES and NO command buttons) 88a & 88b, respectively. The YES command button 88a is configured to receive a user input to accept diagnosis information, e.g., responsive to the user pressing the YES command button 88a. The NO command button 88b is configured to receive a user input to discard unwanted diagnosis information, e.g., responsive to the user pressing the NO command button 88b. When the user wearing the haptic glove 58 contacts the YES or NO button, the position of the user's hand is detected using the position sensors 20 and in turn, the workstation 16 produces an activating signal to drive the haptic actuators 18 for outputting forces to the user's hand.

During operation, the user wears the haptic glove 58 while holding the 3D CAD marker 82 and the 3D CAD marker is navigated through the stereoscopic image or the virtual anatomical structure of a patient's body 70 by the workstation 16 responsive to the user inputs. The 3D CAD marker 82 indicates the likelihood of an anomaly in the stereoscopic image of a patient by using the delineator 84 and displays diagnosis information about the anomaly in the status bar 86. Finally, upon receiving the user input using the command buttons 88a, the display system generates a report containing the diagnosis information in the virtual-reality environment 12. The 3D CAD marker 82 includes a color code feature which enables a user to display diagnosis information in various colors within the GUI.

Figure 6:
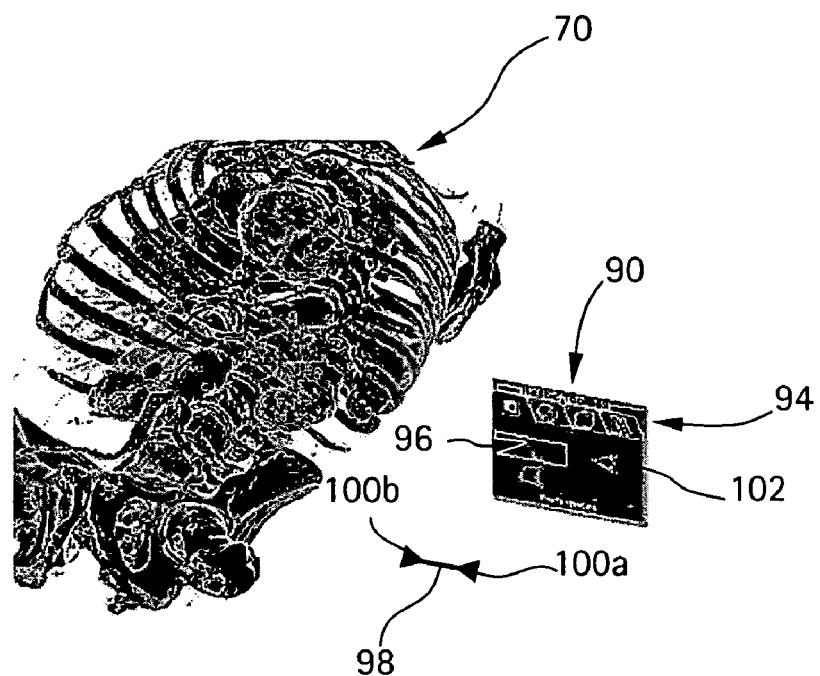
FIG. 6 is a haptic toolbox having a plurality of icons in which one of the plurality of icons is a measurement tool that is in an open position.
Figure 7:
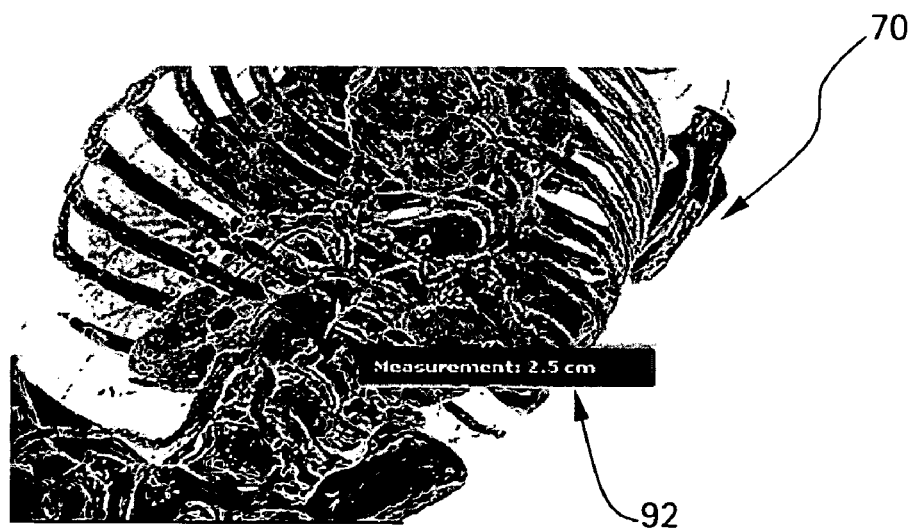
FIG. 7 is a 3D image annotation by using the measurement tool in FIG. 6 in a virtual reality environment.

FIGS. 6 and 7 illustrate a haptic toolbox 90 and a 3D image annotation 92 respectively, in the virtual-reality environment 12. The haptic toolbox 90 includes a plurality of icons 94. One of the plurality of icons includes a linear measurement tool 96 that is configured to permit a user to conduct measurements in the virtual-reality environment. The measurement tool 96 includes a rod 98 having an opposed ends 100. The opposed ends are generally triangular in shape. The measurement tool 96 is configured to be linearly extended or contracted corresponding to a given size of the patient's anatomy. When the measurement tool 96 is placed on the patient's anatomy by the user wearing the haptic glove 58, the measurement tool 96 uses an algorithm for edge detection executed within the display system 10 to measure the linear dimension of the patient's anatomy. The plurality of icons further include nonlinear measurement icons such as angular measurement 102, zoom icon, text icon, and a variety of other icons that are touchable by the user in the virtual-reality environment.

During operation, the display system 10 receives a user input associated with GUI to conduct measurement in the virtual-reality environment 12. The user wearing the haptic glove 58 clicks on the haptic toolbox icon 44, located in the tool palette window 40 shown in FIG. 2, and the haptic toolbox 90 pops up. Next, the user clicks on the measurement tool icon 96 and the measurement tool 96 pops up. The user then grabs the measurement tool 96 and places it on the patient's anatomy to measure thereof and displaying a 3D haptic annotation 92 to illustrate measurement of the patient's anatomy as clearly depicted in FIG. 7. If the length or width of the patient's anatomy is different from the measurement tool, then the user may hold the triangular corners 100a and 100b while extending or contracting the measurement tool 96. When the edges of the triangular corners 100a and 100b coincide with the edges of the patient's anatomy 70, the display system generates a text and numeric indicium "measurement 2.5 cm" and displays the image annotation 92 in the virtual-reality environment 12.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An apparatus comprising:
a 3D volumetric display system configured to generate 3D diagnostic displays of 3D volumetric data acquired from a patient by at least two of an imaging system, a picture archival and communication system (PACS) and an electronic medical record (EMR) system simultaneously in a virtual-reality environment, and wherein the display system is configured to permit a user to conduct diagnostic interpretation of images in the virtual-reality environment and to permit the user to interact with the 3D diagnostic displays, wherein the display system is configured to permit the user to conduct volumetric 3D diagnostic interpretation of images without post-processing the images, wherein post-processing includes having the images manipulated and compiled by a process of image review from the manner of acquisition and reconstruction of images,
wherein the display system comprises a haptics-enhanced virtual-reality device so that the user can touch and interact with a virtual object, wherein the haptics-enhanced virtual-reality device includes a projector, a transflective mirror positioned at an angle, and an overhead substantially opaque screen, which all are coupled to one another to display stereoscopic images that is projected on the overhead substantially opaque screen and is reflected in real-time 3D images on the transflective mirror,
wherein the display system further comprises a haptic force feedback device having robotic manipulators that applies force to the user's hand corresponding to the environment that a virtual effector is in and wherein the haptics force feedback device is used to indicate whether the user's hand is in contact with a virtual anatomical structure of a patient's body.

2. The apparatus of claim 1 further comprising a graphical user interface configured to permit the user to access or navigate through the 3D volumetric data acquired from the patient.

3. The apparatus of claim 2, wherein the graphical user interface permits the user to manipulate the 3D volumetric data in any orientation, angle and zooming setting.

4. The apparatus of claim 2, wherein the graphical user interface enables the user to access, view, manipulate, and conduct diagnostic interpretation of the images.

5. The apparatus of claim 1, wherein the graphical user interface is executed in a virtual reality environment.

6. The apparatus of claim 1, wherein the stereoscopic images displayed in such that the displayed images track the user's head movement and further wherein the stereoscopic images permit the user to view the imagery from more than one position.

7. The apparatus of claim 1, wherein the user's hands are immersed in the 3D diagnostic displays, so the user is capable to manipulate the 3D volumetric data.

8. The apparatus of claim 1, wherein the user is capable to navigate through the 3D volumetric data to locate pathology in the virtual-reality environment.

9. The apparatus of claim 1, wherein the 3D diagnostic displays further comprises a 3D planner image wherein the 3D planner image is constructed from a plurality of 2D images to facilitate measurement of the diagnostic interpretation of images for anomaly.

10. The apparatus of claim 9, wherein the plurality of 2D images include a plurality of 2D viewports which is capable to simultaneously interact with the virtual anatomical structure of the patient's body.

11. The apparatus of claim 9, wherein the 3D planner image is depicted in three orthogonal planes including transverse, sagittal, and coronal planes.

12. The apparatus of claim 9, wherein the 3D planner image and the volumetric 3D diagnostic images are displayed simultaneously.

13. The apparatus of claim 1, wherein the display system is capable of displaying the 2D images, 3D Planner images, and volumetric 3D diagnostic images simultaneously.

14. The apparatus of claim 1, wherein the imaging system includes a picture archiving and communication system (PACS) server and an image workstation coupled to one another.

15. The apparatus of claim 1, wherein the imaging system is a computed tomography (CT) imaging system.

16. The apparatus of claim 1, wherein the imaging system is a Magnetic Resonance (MR) imaging system.

17. The apparatus of claim 1, wherein the imaging system is an X-ray imaging system.

18. The apparatus of claim 1, wherein the imaging system is an ultrasonic imaging system.

19. A diagnostic apparatus comprising:
a display system including a graphical user interface (GUI) configured to be accessed simultaneously in at least two of a picture archiving and communication system (PACS), an image workstation, and an electronic medical record (EMR) system, and to navigate through a diagnostic image data and a patient's data without post-processing of the diagnostic images, wherein the post-processing of the diagnostic images define having the images manipulated and compiled by a process of image review from the manner of acquisition and reconstruction of images, the display system including a haptics-enhanced virtual-reality device coupled to the PACS and the image workstation to display stereoscopic images so that a user can touch and interact with a virtual object,
wherein the haptics-enhanced virtual-reality device includes a projector, a transflective mirror positioned at an angle, and an overhead substantially opaque screen, which all are coupled to one another to display stereoscopic images that is projected on the overhead substantially opaque screen and is reflected in real-time 3D images on the transflective mirror,
wherein the display system further comprises a haptic force feedback device having robotic manipulators that applies force to the user's hand corresponding to the environment that a virtual effector is in and wherein the haptics force feedback device is used to indicate whether the user's hand is in contact with a virtual anatomical structure of a patient's body.

20. The apparatus of claim 19, wherein the graphical user interface further comprising an interface tool configured by the user to customize the user interface on the display system.

21. The apparatus of claim 19, wherein graphical user interface further comprising a tool palette window to display a plurality of images information icons.

22. The apparatus of claim 19, wherein the stereoscopic images are viewed by the user wearing 3D goggles.

23. The apparatus of claim 19, wherein the haptics-enhanced virtual-reality device includes a user input device that is coupled to the display system which allows the user to navigate and to interact with the diagnostic images and the patient's data.

24. A method of assisting medical diagnostic interpretation of images and data, the method comprising the steps of:
generating diagnostic images of a portion of patient's body by using a display system during examination of the portion of patient's body in accordance to symptoms;
replicating the portion of patient's body from the diagnostic images by using a haptics-enhanced virtual-reality device of the display system, wherein the replicating step includes retrieving the diagnostic images from at least two of a picture archival and communication system (PACS), an imaging system and an electronic medical record (EMR) system simultaneously without post-processing the diagnostic images, wherein the display system is configured to permit the user to conduct volumetric 3D diagnostic interpretation of images without having the images manipulated and compiled by a process of image review from the manner of acquisition and reconstruction of images; and
displaying the replicated portion of the patient's body in a virtual environment, wherein the haptics-enhanced virtual-reality device includes a projector, a transflective mirror positioned at an angle, and an overhead substantially opaque screen, which all are coupled to one another to display stereoscopic images that is projected on the overhead substantially opaque screen and is reflected in real-time 3D images on the transflective mirror,
wherein the display system further comprises a haptic force feedback device having robotic manipulators that applies force to the user's hand corresponding to the environment that a virtual effector is in and wherein the haptics force feedback device is used to indicate whether the user's hand is in contact with a virtual anatomical structure of a patient's body.

25. The method of claim 24, wherein the step of generating diagnostic images include volumetric real-time images to locate pathology in the virtual-reality environment.

26. The method of claim 24, wherein the step of generating diagnostic images includes a step of enabling a user to simultaneously navigating among 2D and 3D images and a patient's data.

27. The method of claim 24, wherein the step of generating diagnostic images includes a step of permitting a user to navigate through the diagnostic real-time images and the patient's data without post-processing of the diagnostic images.

28. The method of claim 24 further comprising displaying a 3D planner image constructed from 2D images to facilitate diagnostic interpretation of images.

29. The method of claim 24, wherein the stereoscopic images displayed in such that the displayed images track the user's head movement and further wherein the stereoscopic images permit the user to view the imagery from more than one position.

30. The method of claim 24 further comprising a haptic feedback device having robotic manipulators that push back against the user's hand with a force that correspond to the environment that a virtual effector is in and wherein the haptics feedback device is used to indicate whether or not the user's hand is in contact with a virtual anatomical structure of the patient's body.

31. A diagnostic system comprising:
means for generating diagnostic real-time images of a portion of patient's body during examination of the portion of patient's body in accordance to symptoms;
means for replicating the portion of patient's body from the real-time images, wherein the means for replicating includes retrieving the real time images from any number of a picture archival and communication system (PACS), an imaging system and an electronic medical record (EMR) system simultaneously without post-processing the diagnostic images, wherein the display system is configured to permit the user to conduct volumetric 3D diagnostic interpretation of images without having the images manipulated and compiled by a process of image review from the manner of acquisition and reconstruction of images; and
means for displaying the replicating portion of patient's body in a virtual environment, wherein the means for displaying includes a haptics-enhanced virtual-reality device so that the user can touch and interact with a virtual object, wherein the haptics-enhanced virtual-reality device includes a projector, a transflective mirror positioned at an angle, and an overhead substantially opaque screen, which all are coupled to one another to display stereoscopic images that is projected on the overhead substantially opaque screen and is reflected in real time 3D images on the reflective mirror,
wherein the means for displaying further include a haptic force feedback device having robotic manipulators that applies force to the user's hand corresponding to the environment that a virtual effector is in and wherein the haptics force feedback device is used to indicate whether the user's hand is in contact with a virtual anatomical structure of a patient's body.

32. The diagnostic system of claim 31, wherein means for generating diagnostic real-time images include volumetric real-time images to locate pathology in the virtual-reality environment.

* * * * *